United States Patent [19]
Bomba et al.

[11] 3,777,421
[45] Dec. 11, 1973

[54] LAWN BORDER
[76] Inventors: Joseph A. Bomba, 107 Treemont Rd., Johnstown, Pa. 15906; Andrew J. Bomba, 742 East Dr., Circleville, Pa. 15642
[22] Filed: Jan. 26, 1972
[21] Appl. No.: 220,858

[52] U.S. Cl. .................................................. 47/33
[51] Int. Cl. ............................................. A61g 1/00
[58] Field of Search ............................. 47/32, 25, 33

[56] References Cited
UNITED STATES PATENTS
3,619,944  11/1971  Matvey ................................... 47/33
2,713,751  7/1955   Hendrixson ............................. 47/33
3,289,349  12/1966  Valdez ..................................... 47/33
2,662,343  12/1953  Rice ......................................... 47/33
1,916,494  7/1933   Schrickel ................................ 47/33

Primary Examiner—Robert E. Pulfrey
Assistant Examiner—R. T. Rader
Attorney—John B. Sotak

[57] ABSTRACT
This disclosure relates to a ground dividing edging including lower ground engaging supporting members and upper snap-on capping members having an upstanding retaining wall portion and a substantially horizontal running surface portion for bordering a lawn area from an adjacent ground area.

10 Claims, 4 Drawing Figures

PATENTED DEC 11 1973

3,777,421

LAWN BORDER

This invention relates to ground dividing edging and, more particularly, to a border for effectively separating a lawn area from an adjacent ground area with a minimum cost to the purchaser and without laborious installation and upkeeping problems to the user.

While numerous types of borders have been developed in the past, each of these previous ground dividing edgings is possessed of certain shortcomings. Corrugated foil, wooden fence, wire fence and cement block, or brick types of edgings are commonly used by individuals to border a garden, a flower bed, a shrubbery plot or a base of a tree. The corrugated foil edging is usually difficult to set into the ground and is easily bent and torn due to its flimsy construction. The wooden picket fence edging normally requires frequent and repeated painting due to weatherbeating and eventually the base of the stakes or posts decay. The wire fence edging is susceptible to rust and oxidation and is readily bent and broken. The cement block or brick edging is initially expensive to purchase and is easily misaligned due to the heaving of the ground during freezing and thawing periods. It will be noted that each of the above-noted edgings requires constant maintenance in order to avoid an unsightly appearing border. That is, each of these previous edgings requires either at least an annual painting and/or realignment to maintain its aesthetic appearance. Further, when the border edges a lawn area, it is necessary to trim the grass around the edges of the border in order to maintain a neat appearance since the blade of a lawn mower is unable to cut the stripe of grass near the edge of the previous types of borders. It will be appreciated that these failings as well as other inherent weaknesses of the above-mentioned edgings not only result in an initial high purchase price and subsequent maintenance cost but also require time and effort which the home owner could spend doing other and more useful things.

Accordingly, it is an object of this invention to provide a new and improved ground dividing edging which overcomes all of the above-mentioned shortcomings.

A further object of this invention is to provide a novel border which requires no annual painting and little, if any, maintenance after the initial installation.

Another object of this invention is to provide a new lawn edging which alleviates the necessity of trimming of the grass after being cut by the lawn mower.

Yet a further object of this invention is to provide an improved ground dividing border which is impervious to the weather and ground conditions.

Yet another object of this invention is to provide a new and useful lawn dividing edging which is decay and oxidation resistant.

Still a further object of this invention is to provide a novel ground edging which generally is unaffected by the heaving of the ground during freezing and thawing periods.

Still another object of this invention is to provide a novel and improved ground border which retains its aesthetical appearance for long periods of time.

Still yet a further object of this invention is to provide a ground dividing edging including one or more lower base members which are securely attached to the ground and including one or more upper cap members which are snap-fastened to the lower base members.

Still a further object of this invention is to provide a ground dividing border which is simple in construction, economical in cost, easy to install, and facile to maintain.

Generally, our invention relates to a ground dividing edging including a base supporting member and a top capping member which form a border between a lawn area and a contiguous ground area. The base supporting member is constructed of a flat pliable material which is laid on the surface of the ground. The base supporting member is secured in place by fasteners which are driven into the ground. Cutouts are formed along the length of the base supporting members for minimizing heaving during winter weather and for preventing the buildup of moisture and water from rain and snow. The top capping member includes an upstanding retaining wall portion and a substantially horizontal running surface portion. The top capping member includes a plurality of depending tabs which are aligned with agreeing apertures formed in the base supporting member for effectively securing the top capping member to the base supporting member. The top capping members are preferably interfitted at their adjoining edges to increase the strength and stability of the border.

A better and more complete understanding of our invention will be had by reference to the drawings, in which similar characters of reference depict similar parts throughout the various views and in which.

Figure 1:
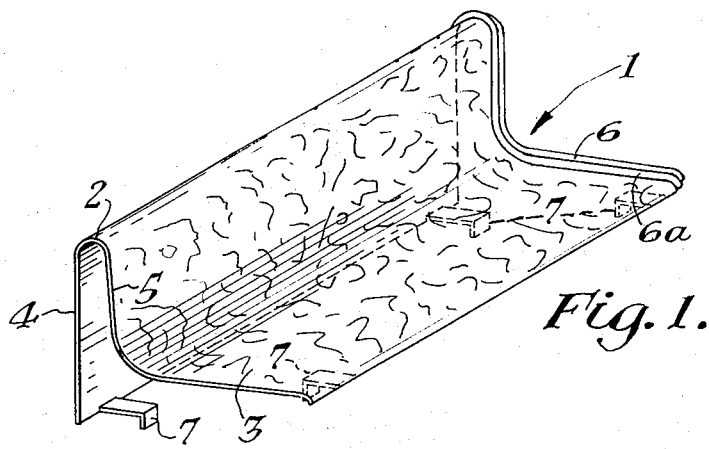
FIG. 1 is a perspective view of a top capping member which is used in forming the ground dividing edging in accordance with our invention.

Referring to the drawings and in particular to FIG. 1, there is shown a preferred form of a top capping member generally characterized by numeral 1. In practice, the capping member 1 is molded or extruded from a suitable nonmetallic material, such as, filled plastic, fibrous concrete, or similar substances which have unusual outdoor weathering characteristic to withstand extreme environmental conditions. The cross-sectional shape of the cap member 1 resembles a cavetto molding in that the vertical surface of the upstanding leg 2 is substantially orthogonal to the substantially horizontal or slightly canted leg 3. The vertical leg or wall 2 includes an inner surface 4 which retains the soil of a garden and normally faces the grassless area of a plant bed, walkway, driveway, or the like. The top of the inner wall 4 is turned back upon itself and forms a smooth contoured exterior surface which is free of a sharp and ragged surface. The vertical wall 2 includes an outer surface 5, the lower end of which is curved and meets with the substantially horizontal wheel running leg 3. The forward edge of the running leg 3 is curved downwardly and rounded off to provide a smooth surface and a substantially flat abutting edge for mounting purposes. As shown, one side edge 6 of the exposed surface of the cap member 1 may be provided with a raised or bead type portion 6a, or if desired, any other shape of joint which simulates a raised mortar joint. When a pair or a plurality of cap members 1 are placed in side-by-side relation the side edge 6 is slipped under the opposite adjacent edge of the adjacent cap member so that the members are slightly overlapped. Thus, the outer surface of edge 6 mates with the inner surface of the adjacent abutting cap member. Hence, in addition to simulating a raised mortar joint, the bead 6a operates as a stop means against which the edge of an adjoining cap member rests. The underside of the cap member 1 is provided with a plurality of depending tabs or lugs 7. The tabs 7 may be integrally formed or may be attached to the body of member 1 by a suitable adhesive, such as, by commercially available epoxy resin cement. The tabs 7 are shown as L-shaped pieces each having its horizontal leg extending inwardly and its vertical leg extending downwardly, the purpose of which will be described in greater detail hereinafter.

Figure 3:
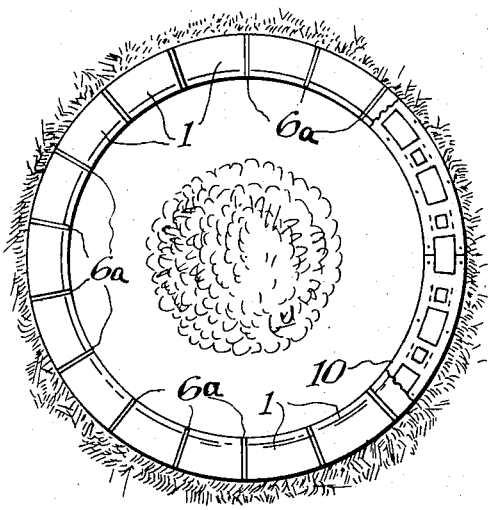
FIG. 3 is a top plan view, partly broken away, showing a circular edging configuration of our invention.
Figure 4:
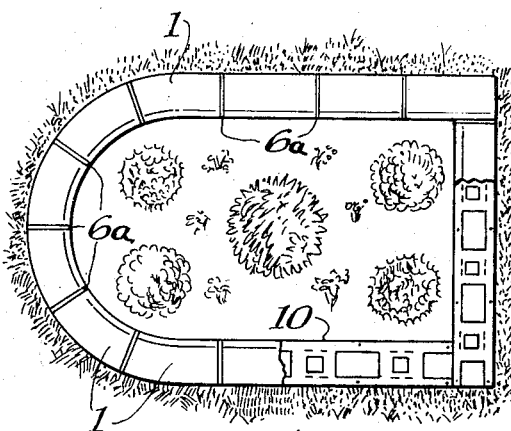
FIG. 4 is a top plan view, partly broken away, illustrating another configuration of a garden border which has one end semi-circularly shaped and which has the other end shaped in the form of right angles.
Figure 2:
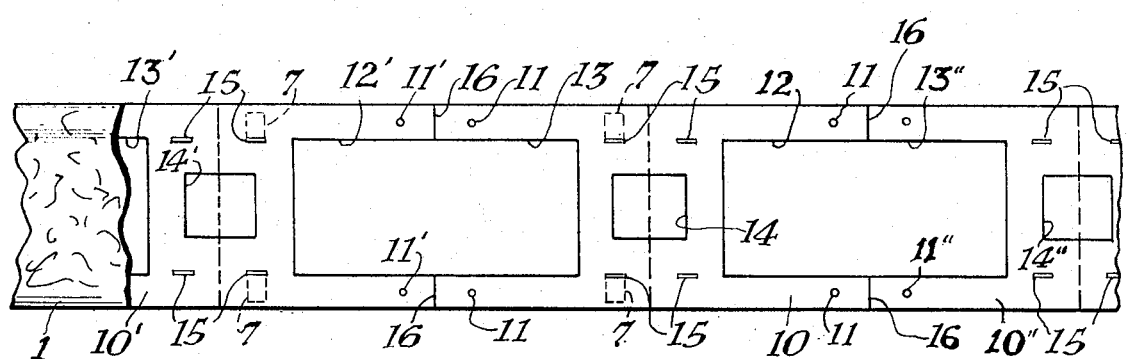
FIG. 2 is a partial fragmentary top plan view of the ground dividing edging with detailed illustration of several straight sections of the base supporting members which are initially laid on and secured to the ground.

Turning now to FIG. 2, there is shown the details of several straight sections of the base supporting members 10, 10' and 10". Each of the base supporting members is substantially identical with the exception that the curvature may vary from straight pieces to arcuate pieces to form a linear or a circular border configuration. The base members are laid end-to-end to form the outline of the selected garden area. As shown in FIG. 3, the base members may be used to form a circular configuration around a tree or the like; or the base members may be used to form an oblong configuration having square or round ends, as shown in FIG. 4. Further, it will be appreciated that different configurations, such as, kidney, serpentine, diamond, star, parallelgram, or other mensurations may be formed, if desired. The base members 10, 10' and 10" are preferably but not necessarily formed of an elongated flat piece of flexible material which is laid on the surface of the earth. The base member 10 is securely held in place by a plurality of nails 11 or the like which are driven into the ground. Similarly, base members 10' and 10" are held fast by nails, two of which are characterized by numerals 11' and 11" in FIG. 2. It has been found that ground heaving occurring during winter freezing and thawing periods tends to cause previous borders to become disarranged. The border members are moved out of alignment with each other and present an unsightly view unless rearranged to their original positions. The misalignment not only is annoying to the owner but also requires that he expend time and effort to rearrange the disarranged border. In order to handle this heaving problem, it has been found advantageous to reduce the amount of contiguous surface area that the base members present to the ground. Thus, apertures or cutouts are formed in each of the base members. For example, a rectangularly shaped hole or cutout 12 is formed on one end of base member 10. Similarly, the other end of base member 10 is also provided with a cutout which is illustrated by numeral 13 in FIG. 2. A smaller intermediate cutout 14 is formed in the base member 10. The base members 10' and 10" also include cutouts such as 12', 13' and 14' and 13" and 14", respectively, which effectively reduce heaving problems during the cold winter season. The apertures or cutouts allow the earth to move freely upwardly during heaving and permit the earth to recede during periods of thawing. It will be apparent that the size, shape, and number of cutouts may be varied dependent upon certain exigencies, such as, the degree of heaving in the particular locale, the type of construction and material of the base members, the length, width and thickness of the base members, etc.

As previously mentioned, the base members are adapted to accommodate the capping members 1 to a lawn border, two examples of which are illustrated in FIGS. 3 and 4. It has been found advantageous to detachably attach the capping members to the base members so that the owner may quickly and easily reform the configuration of the garden border and may readily and facilely replace a broken or discolored member. The attachment is accomplished simply by inserting the vertical legs of tabs 7 into agreeing apertures 15 formed in the base members 10, 10' and 10". When the tabs 7 of the capping members 1 are snapped into place, the bottom surface of the front edge of the horizontal leg 3 and the bottom surface of the vertical wall 4 will become flush with the top surface of the base members 10, 10' and 10". Preferably, the tabs 7 of the capping members are snapped into the apertures 15 of two adjoining base members as shown in phantom in FIG. 2. By staggering the capping members 1 between adjacent base members 10 and by overlapping adjoining cap members 1, a more rigid structure is realized in that the joint 16 formed between the base members is reinforced by the straddling capping members. That is, each adjoining base member not only is secured in place by the nails 11 but also is held together by the capping members which are snap fastened by tabs 7 and apertures 15.

Preferably, the upper surface of the wheel running surface leg 3 is slightly below the top of the normal grass cutting level. This ensures that the cutting blade will not engage the capping members when an operator runs the near wheels of the lawn mower over the substantially horizontal leg 3 or running surface portion. Thus, a neat grass edge may be realized without the need of trimming. The garden earth or the like may be filled at any level behind the vertical wall 4. It will be appreciated that the exterior of the capping members may be roughened to simulate a concrete finish, and thus when joined together the raised bead 6a will appear as a mortar joint as shown in FIGS. 3 and 4.

Thus, any average home owner may quickly and easily install a rigid, reliable, and inexpensive border around the edge of his garden, flower bed, walkway, driveway, or the like.

It will be appreciated that certain changes, modifications, and alterations may be made to the presently described embodiment without departing from the spirit and scope of our invention. For example, the base and capping members may be constructed of other materials than those described, such as, rigid or flexible metallic and nonmetallic material. Further, the fastening nails 11 may be replaced with other staking devices which could be separate from or integrally formed with the base members 10. The type of tabs 7 and the shape of apertures 15 may obviously take other forms. In addition, it is also understood that the lugs and apertures may be reversed and that other forms of fastening means may be interchanged, if desired. The particular lengths, widths and configurations of both the base members and the capping members are a matter of choice and may be varied in accordance with the desire of the manufacturer.

Therefore, the details herein shown and described have been given only for clarity purposes, and the breadth and scope of our invention is only limited by the claims annexed hereto.

Having thus described our invention, what we claim is:

1. A ground dividing edging for bordering a lawn area from an adjacent ground area comprising, a plurality of contiguous flat base members adapted to be laid on the surface of the ground for forming an outline of the ground area which is to be divided from the lawn area, and a plurality of contiguous cap members each having a substantially vertical retaining wall portion and a substantially horizontal supporting surface portion, each of said plurality of said cap members disposed atop said flat base members wherein said cap members and said flat members include interlocking means which permit said cap members to be detachably secured to said flat members.

2. A ground dividing edging as defined in claim 1, wherein said flat base members are rigidly fastened to the ground by ground retaining members.

3. A ground dividing edging as defined in claim 1, wherein said flat base members include cutout portions which minimize heaving misalignment during periods of freezing and thawing and prevent water from accumulating on the base member.

4. A ground dividing edging as defined in claim 1, wherein said interlocking means includes a plurality of tabs and a plurality of agreeing apertures for snapping the two members together.

5. A ground dividing edging as defined in claim 1, wherein said cap members are fitted in an overlapping relationship with an adjoining cap member.

6. A ground dividing edging as defined in claim 1, wherein said horizontal supporting surface portions of said cap members are positioned slightly below the normal grass level of the lawn so that when the wheels of a lawn mower pass over said horizontal supporting surface portions the adjoining blades of grass are sheared to the same level as the lawn.

7. A ground dividing edging as defined in claim 1, wherein a cap member straddles the ends of two adjoining elongated flat base members to securely hold said two adjoining elongated flat base members together.

8. A ground dividing edging as defined in claim 1, wherein the outer surface of said cap members is concrete textured and a portion between two adjoining cap members simulates a mortar joint.

9. A ground dividing edging as defined in claim 1, wherein said flat base members take the form of long straight strips having a length which is a multiple of the length of said cap members.

10. A ground dividing edging as defined in claim 1, wherein said flat base members take the form of arcuate strips and said cap members are arcs having a curvature corresponding to said arcuate strips and the mean length of said arcuate strips is a multiple of the mean length of said arcs.

* * * * *